July 2, 1940.  H. SCHEDEL  2,206,489
ELECTRIC DISCHARGE VESSEL
Filed May 20, 1937  2 Sheets-Sheet 1
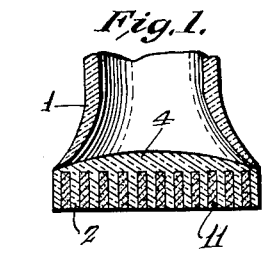
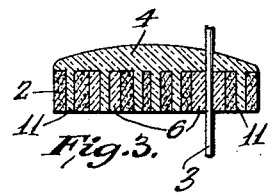
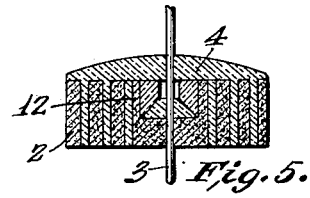
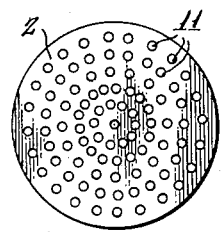
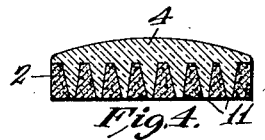
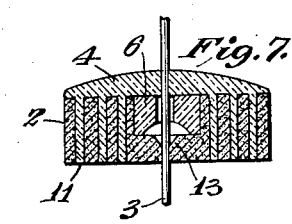
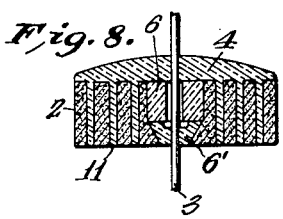
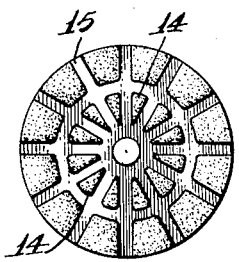
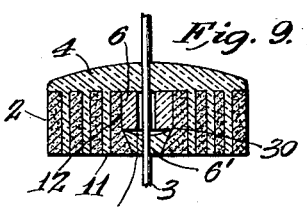
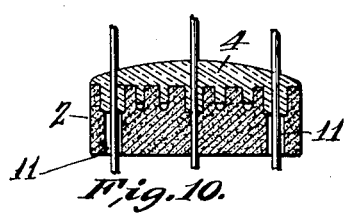
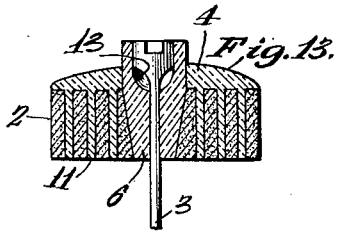
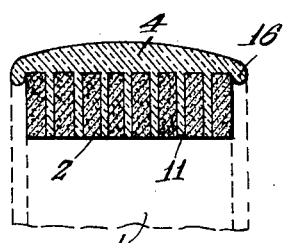
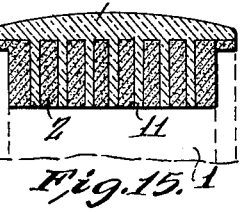
Inventor,
Hans Schedel
by R C Hopgood
Attorney.

July 2, 1940.  H. SCHEDEL  2,206,489
ELECTRIC DISCHARGE VESSEL
Filed May 20, 1937  2 Sheets-Sheet 2
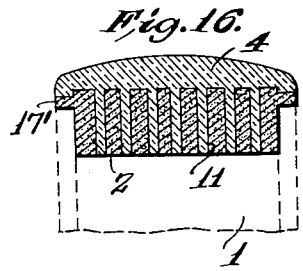
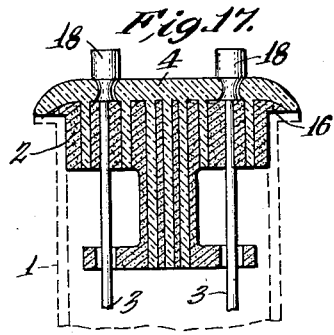
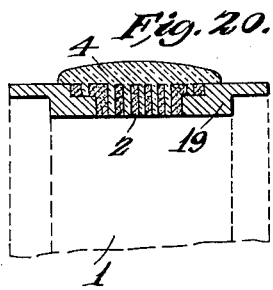
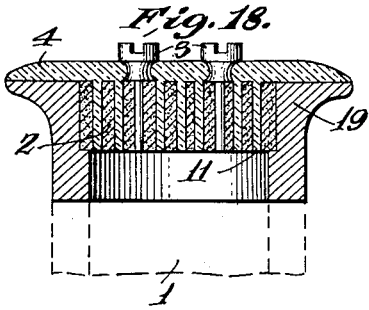
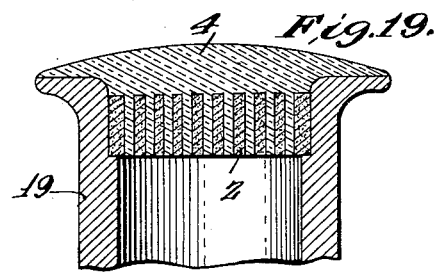
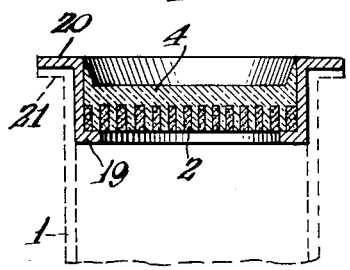
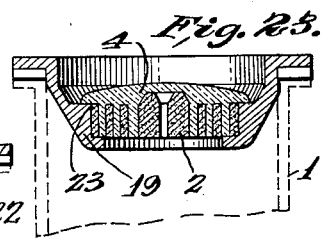
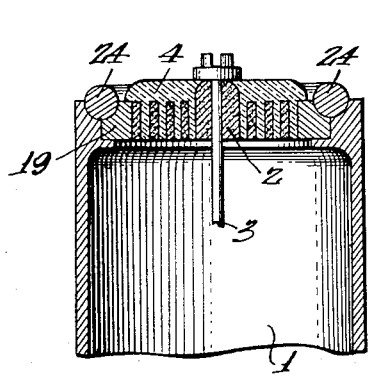
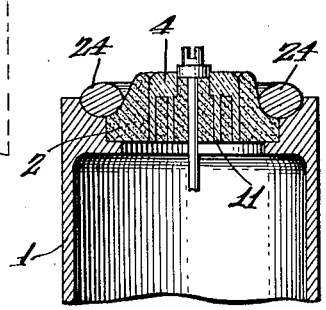
Inventor:
Hans Schedel
by RCHopgood
Attorney.

Patented July 2, 1940

2,206,489

UNITED STATES PATENT OFFICE 2,206,489

ELECTRIC DISCHARGE VESSEL

Hans Schedel, Stuttgart, Germany, assignor, by mesne assignments, to Erich F. Huth G. m. b. H., Berlin, Germany, a company Application May 20, 1937, Serial No. 143,740
In Germany May 14, 1936

9 Claims. (Cl. 250—27.5)

This invention relates to new and useful improvements in envelopes or other vessels for electron discharge devices.

It has been heretofore proposed to employ porous ceramic bodies for supporting the parts of the electrode assembly of electron discharge devices. For this purpose ceramic materials must be used which have small capacity and which will cause negligible electric losses. Such materials, however, will, during the operation of the tube, give off occluded gases and destroy the vacuum in the tube. Ceramic materials which can be easily degassified are, as a rule, not of a dense structure, and are therefore not suitable for use in electron tubes or the like. Furthermore, where a seal of ceramic material is used which contacts with other materials such as glass, metal, etc., strains will be set up at the joints after the current leads have been sealed in the ceramic material, and such strains will cause cracks to form in the seal.

The last mentioned difficulty cannot be cured by using ceramic materials having the same coefficient of expansion as the materials with which it contacts, because then the other materials cannot be effectively heated. As a matter of fact, the strains occur in the manufacture of such seals while the structure is cooling.

The present invention provides a structure and a method whereby these drawbacks are avoided.

In accordance with the invention, a ceramic cover or seal for the discharge vessel or envelope has a pitted or porous surface provided with numerous holes or cavities extending partly or completely through the body of the ceramic material which, in order to make the seal airtight and to fix the lead-in wires in place, is coated with a layer of glass or the like.

When such seals are used they are, in accordance with the present invention, coated with glass which preferably penetrates into the ceramic material and forms with the ceramic material a very firmly interlocked structure. Even where the glass and the ceramic material thus interlinked have different coefficients of expansion, the formation of strains can be avoided by proper choice of the porosity of the material or suitable shaping of the openings provided therein. The electrode assembly of the electrode discharge device may be mounted directly on the glass-coated ceramic body which forms a part of the enclosing envelope for the electrodes. The ceramic seal may be fastened to the balance of the vessel or envelope by means of the same kind of glass that was used in coating the ceramic body.

The glass coating on such ceramic seal may readily be provided by melting or pouring liquid glass on it. It has been found that even in case of great temperature changes the seal will remain tight.

The invention will be more clearly understood from the following description, reference being had to the accompanying drawings, in which—

Fig. 1 is a fragmentary sectional view of an electron tube in accordance with my invention;

Fig. 2 is a bottom plan view of Fig. 1;

Figs. 3 to 11 are sectional views each illustrating a modification of the cover shown in Figs. 1 and 2;

Fig. 12 is a plan view of Fig. 11 with the glass seal removed;

Fig. 13 is a sectional view of still another modification of the cover represented in Figs. 1 and 2; and Figs. 14 to 25 are sectional views each showing a modified form of the cover represented in Figs. 1 and 2, and also showing the mode of fastening the cover in the side wall of a discharge vessel.

The same or similar reference characters denote the same or similar parts throughout the several views.

In Figs. 1 and 2 the simplest form of an electron tube is represented whose ceramic body 2 is a perforated disc of porous material which will produce only small losses. The glass seal 4 when applied to this disc enters the bores 11 thereof. The bores 11 thus being entirely or partially filled with glass, cause the glass seal or coating 4 effectually to adhere to body 2. The glass seal 4 serves also to interconnect body 2 and the wall 1 of the vessel or envelope. The bores 11 are uniformly distrbuted. The tubular vessel whose wall is designated 1, is arranged on the same side of the body 2 as the glass seal 4.

As shown in Fig. 3, body 2 may contain sockets 6. These consist of a ceramic material having small dielectric losses and enclose the current leads 3. Body 2 is covered with the glass seal 4 which serves also to hold the leads 3.

The bores shown in Fig. 4 are of a conical shape, insuring that the glass seal will penetrate easily.

The perforated ceramic bodies 2 illustrated in Figs. 5 and 14 are provided with cavities 12, through which the leads 3 extend, these being fixed in the body 2 by metal seals 13. The space between the leads 3 and the wall of the cavities 12 is filled up with ceramic sockets 6 which cover the metal seals 13 and are themselves coated with the glass layer 4.

According to Fig. 7 the metal seal 13 may be disposed in a cavity of the ceramic material, thus fixing the lead 3 to the body 2 itself.

The arrangement shown in Fig. 8 is similar to that represented in Fig. 7 but has a socket 6' which is disposed in body 2 and in alignment with sockets 6 and consists of a material different from that of sockets 6, preferably a ceramic material having small dielectric losses. Lead 3 is fixed in sockets 6' with the aid of the metal seal 13. Socket 6 covers the metal seal 13 and is coated with the glass layer 4 which also serves to seal the lead 3.

As shown in Fig. 9, the ceramic socket 6' in which the lead 3 is fixed may be sealed by the metal flux 13 to the wall of the cavity 12, the lower edge of the socket 6 being recessed for this purpose, as indicated at 30.

The bores 11 need not extend entirely through the body 2, but may terminate within the body. Such bores are uniformly distributed and their number and cross-sectional area depend on the purpose for which the body 2 is intended and on the available or desired quantity of glass. When the softened glass flows into and solidifies in the bores 11, the assembly will be solid and without strains in its glass portion. These advantages are attained especially if the bores 11 are small and numerous and are uniformly distributed.

In Figs. 10, 11 and 12, bores or cavities of special kinds are disclosed. In the arrangement illustrated in Fig. 10 the body 2 not only has perforations 11, but also cavities 11' into which the glass seal 4 may enter. In the arrangement illustrated in Figs. 11 and 20, body 2 has concentric annular grooves 14 and radial grooves 15 which act firmly to interconnect the glass 4 and the body 2 in a similar manner to the cavities 11'.

Fig. 13 shows the body 2 as containing a ceramic conical socket 6 wherein a lead 3, enlarged at its upper end, is disposed, the lead being fixed therein by the metal seal 13. The socket itself is fixed by the glass 4. This construction has the advantage that the lead can be fitted in a finished state to body 2 and will, after sealing, not be able to move in the soft glass seal.

All the described devices comprise a ceramic body or disc and a glass seal provided on one face thereof. Such a composite body is to a remarkable extent possessed of properties which are necessary for a compact construction of electrode systems arranged in discharge vessels. A body of this construction does not easily soften and makes possible the mounting of the electrode system on the ceramic material without danger that the stability of the electrode system might be impaired by the heat employed in effecting the sealing operations. The ceramic material may be a substance having suitable dielectric and capacitive characteristics and ensures that the electrode system is fixed in a manner to produce only very small losses especially at very high frequencies.

The leads supporting the electrode system may be fixed on the ceramic body by means of metal seals which insure that the rigidity of these supporting wires or leads shall not be impaired by the highest temperatures used in the sealing operation.

Owing to the provision of perforations or bores in the ceramic body, there will be practically no strains in the glass layer which reaches into these bores. For this reason the ceramic body may be given any desired shape and any necessary cross-section, and other ceramic or metallic bodies may penetrate into it, or the glass layer may project beyond the edge of the ceramic body or may be turned downward at the edge thereof. Furthermore, the ceramic body may be melted into a unitary structure with metal bodies, such as wires, sheet metal or rings.

Special advantages are obtained if the ceramic body is of a porous material and is in addition provided with perforations or bores. In this case the high degree of porosity causes the glass flux not only to enter the bores of the body, but also into the pores of the ceramic material, so that after the solidification of the glass a disc- or cap-shaped glass body somewhat similar in shape to the ceramic body and having finger-shaped projections, is obtained; that is to say, projections between which ceramic material is located.

With such construction of a cover for discharge vessels the glass when applied to the ceramic body may be in a red-hot liquid state, and while in this state may be suddenly cooled down without any cracks forming in the glass layer.

A body of this construction may be manufactured separately and then added as a cover to the other parts of a discharge vessel by melting it onto these, or either all or some of the parts of this vessel may be mounted on such body, and the wall of the vessel may then be sealed with the aid of a glass bead projecting beyond the edge of the body.

This will be clear from Figs. 14 to 25.

Figs. 14, 15, 16 each show a different assembling of the ceramic body with the wall of the vessel. The ceramic body is sealed to the glass or metal wall of the vessel. In the arrangement according to Fig. 14, the edge 16 of the body 2 is rounded off, whereby the liquid glass employed for sealing will readily flow over edge 16, forming a tight glass seal between body 2 and wall 1. According to Fig. 15, the body 2 may have a flange 17 that rests on the edge of the wall 1 suitably connected therewith. As shown in Fig. 16, the body 2 may have a thin edge 17' which is not flush with the outer surface of the body 2.

Fig. 17 represents a body 2 of porous ceramic material. The leads 3 are provided with connection sockets 18 and are inserted each in one of the perforations of the body 2. The glass seal 4 forms a seal also for these sockets 18 and at the same time acts to fasten the body 2 at the edge 16 thereof to the wall 1 of the electron tube.

In the arrangement shown in Fig. 18 the body 2 is surrounded by a ring 19 whose face end is flush with the outer face of the body 2. Both parts 2, 19 are coated with the glass seal 4 by which the leads 3 are fixed.

In the arrangement represented in Fig. 19 the body 2 is countersunk in the ring 19 surrounding it, whereby the seal or coating 4 shall cover the joint between the two.

In the arrangement illustrated in Fig. 20 the body 2 is seated in a metal ring 19 which in its turn is attached to the wall 1. The face ends of the metal ring 19 and of body 2 are flush, whereby the vessel may be made very short.

In the arrangement shown in Fig. 21 the metal ring 19 carrying the body 2 is drawn into the wall 1 of the vacuum vessel while the outer edge of the ring 19 is drawn over the flanged edge of the wall 1 so as to form a flange 20 resting on a flange 21 of the vessel. This construction is particularly advantageous if the wall of the vacuum vessel is made of metal, since in this case the flanges 20, 21 may be fastened to each other by welding. Body 2 and ring 19 are coated with the same glass seal 4.

The construction shown in Fig. 22 is similar to that represented in Fig. 21, but in Fig. 22 the outer edge 22 of the body 2 is rounded off in order that the seal 4 cover also the joint between body 2 and the carrying ring.

In the arrangement illustrated in Fig. 23 the ring 19 enclosing the body 2 is so shaped that the joint covered by the glass seal 4 is located between flush parts, namely, the edge of body 2 and an annular part 23 of the ring 19.

In the arrangement shown in Fig. 24 the body 2 is held in the wall 1 by a metal ring 19 which in turn is fastened to the wall 1 by a metal seal 24. Body 2 and ring 19 are interconnected by the glass coating 4 by which a lead or supporting wire 3 is retained in place.

In the arrangement represented in Fig. 25, body 2 and wall 1 are interconnected by a metal seal 24 without the intermediary of a metal ring, like ring 19 shown in Fig. 24. The body 2 and coating 4 are interconnected by the glass in the perforations.

The invention is not restricted in scope to the examples here disclosed. In fact it is applicable whenever glass, ceramic material and metal, or only metal and ceramic material are to be interconnected by a seal. The essential feature is that thereby a ceramic body is provided with openings whereby the seal and the ceramic body will be intimately interlocked to obviate internal strains. The coating material which may either be glass or metal, may be applied to the ceramic body either in a liquid or softened state, or in its solid state. If employed in the solid state, the coating material may be liquefied in a furnace.

What is claimed is:

1. An electrical discharge vessel having a closure plate of porous ceramic material, said plate being provided with numerous cavities the dimensions of which are large with respect to the pores of the porous material and a seal of glass covering the entire plate and extending into said cavities, said cavities serving to reduce the formation of strains between said plate and the glass seal resulting from differences in the coefficients of thermal expansion thereof.

2. An electrical discharge vessel having a closure plate of porous ceramic material, said plate being provided with numerous cavities the dimensions of which are large with respect to the pores of the porous material, leading-in conductors positioned in some of said cavities and a seal of glass covering the entire plate and extending into said cavities, said cavities serving to reduce the formation of strains between said plate and the glass seal resulting from differences in the coefficients of thermal expansion thereof.

3. A vessel in accordance with claim 1 wherein said plate is joined to said vessel by said glass seal which extends over the entire surface of said plate and the neighboring portion of said vessel.

4. An electrical discharge vessel according to claim 1 wherein the coating is a glass layer inside the vessel.

5. An electrical discharge vessel according to claim 1 wherein the ceramic material of said plate is surrounded by a metal ring the portion of which adjacent to said ceramic material is also coated with said glass seal and another portion of which is sealed to the wall of said vessel.

6. An electrical discharge vessel according to claim 1 wherein said seal of glass extends over the surface of the wall of said vessel adjacent to said closure plate and serves to seal said plate to said wall.

7. An electrical discharge vessel having a closure plate of porous ceramic material said plate being provided with numerous cavities the dimensions of which are large with respect to the pores of the porous material and some of said cavities passing entirely through the ceramic material, sockets in said cavities last mentioned, supporting wires in said sockets, a seal of glass covering the entire plate and extending into said cavities, said cavities serving to reduce the formation of strains between said plate and the glass seal resulting from differences in the coefficients of thermal expansion thereof and means for fixing said supporting wires in said sockets comprising a seal which is more difficult to soften than said seal of glass first mentioned.

8. An electrical discharge vessel according to claim 1 wherein the edge of said plate is rounded off on the side thereof to which said seal of glass is applied.

9. An electrical discharge vessel according to claim 1 having an annular metal member surrounding said ceramic material and fastened to the wall of the vessel by a seal, said ceramic body being counter-sunk in said annular member.

HANS SCHEDEL.